United States Patent Office 3,381,025
Patented Apr. 30, 1968

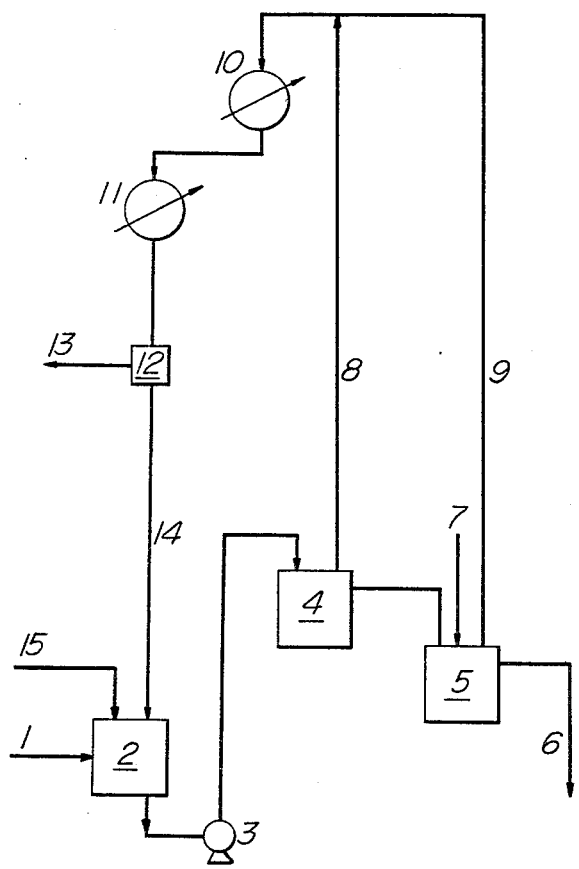

3,381,025
PROCESS FOR PREPARING ISOCYANATES
Hidetoshi Mitsumori, Kamakura-shi, Yasuo Murakami, Tokyo, Goichi Miyoshi, Yokohama, and Takehiko Shimatani, Tokyo, Japan, assignors to Hodogaya Chemical Co., Ltd., Tokyo, Japan, a corporation of Japan
Filed Dec. 29, 1964, Ser. No. 421,985
Claims priority, application Japan, June 29, 1964, 39/36,364
7 Claims. (Cl. 260—453)

ABSTRACT OF THE DISCLOSURE

A process for the continuous production of an organic isocyanate from an organic primary amine by two stage reaction at low and high temperatures which comprises evaporating a mixture of the inert solvent and excessive phosgene used in the reaction and the generated hydrogen chloride gas at a high temperature reaction stage, then cooling the evaporated gas mixture to separate the hydrogen chloride therefrom, and thereafter recycling the thus recovered mixture of phosgene and the inert solvent in the cooled state to a low temperature reaction stage.

---

An improvement in the continuous process for producing an isocyanate, wherein an amine is reacted with excess phosgene in the presence of an inert solvent. The components are reacted sequentially in a first reaction zone and then in a second reaction zone. The improvements in the process comprise:

(a) Maintaining said first reaction zone at a temperature below 60°, and utilizing an inert solvent having a boiling point between 100 and 190° C. and less than the boiling point of the product isocyanate;

(b) Continuously introducing the reaction mixture containing the reaction product produced in the first reaction zone to the second reaction zone, and maintaining said second reaction zone at a temperature above the boiling point of said inert solvent, whereby a gaseous mixture containing said inert solvent, unreacted phosgene, and hydrogen chloride gas generated during the reaction process, is evaporated, the total amount of the inert solvent evaporated in said second reaction zone is controlled so as to be in an amount greater than twice the total amount of phosgene introduced into said first reaction zone;

(c) Introducing additional phosgene into said second reaction zone to complete the reaction producing the product isocyanate;

(d) Recovering said evaporated gaseous mixture of inert solvent, unreacted phosgene and hydrogen chloride from said second reaction zone and cooling said gaseous mixture to a temperature below −20° C., to separate the hydrogen chloride gas from the inert solvent and phosgene which is recovered as a very cold solution of phosgene in said inert solvent;

(e) Recycling said very cold solution of phosgene in said inert solvent to the first reaction zone.

This invention relates to an improved process of recovering, recirculating and reusing excessive phosgene in the continuous production of organic di- or polyisocyanates by treating organic primary di- or polyamines with phosgene.

In the commercial production of organic di- or polyisocyanates, important starting material of urethane, the corresponding amines are directly treated with phosgene in an inert organic solvent usually in the successive reaction zones of low and high temperature. Thus, in the first zone of cold reaction, amines are treated with phosgene in an inert solvent to produce a reaction product in suspended state, which is then heated to a high temperature in the next hot reaction zone to react with phosgene for effecting further advance and completion of the reaction.

As known in the art, to employ an amount of phosgene much exceeding over that theoretically required as well as a large amount of inert solvent is regarded as essential for increasing the yield of isocyanate. Accordingly, the efficiency of recovering the inert solvent and the excessive phosgene have been very important in the commercial practice of this reaction system.

By this reason, a large part of the expenditure for installing the plant for this reaction has been usually spent for the said recovering device. Conventionally, a large amount of phosgene existing together with gaseous hydrogen chloride in the outlet gas from the phosgenating reactors has been recovered after removal of solvent either by absorbing with fresh solvent or by liquefying at very low temperatures. However, these recovering processes revealed disadvantages of requiring complicated circulatory system and higher equipping cost, particularly so in the system of continuous production as for the recirculating connection of the recovering zone with phosgenating zone.

The purpose of this invention is to provide an improved method of recovering and recirculating excessive phosgene and inert solvent in continuous treatment of organic primary di- or polyamines with phosgene.

The process of this invention has been developed based on the motion that the large amount of solvent is required for the cold reaction only and not for the hot reaction in the said system of cold-hot reactions. According to the principle of this invention, all the reaction stages may be arranged quite reasonably regarding heat balance, solubility equilibrium and reaction conditions with the desirable advantages of simplifying the recovering and circulating system and operating the cold and hot reactions at optimum conditions, by carrying out recovering distillation of a large part of solvent, not required in the hot reaction, directly in the hot reaction zone and recovering of excessive phosgene, if required.

The purpose of this invention is to provide an improved continuous process of cold-hot reactions including directly contacting an amine with phosgene in the presence of inert solvent to produce corresponding isocyanate.

The present invention is a process of continuously producing organic di- or polyisocyanates through the stage of cold reaction wherein organic primary di- or polyamine is contacted with phosgene in the presence of an inert solvent followed by the stage of hot reaction characterized by that the said solvent possesses boiling point lower than that of the organic isocyanate to be formed and selected from the group comprising aromatic hydrocarbons and nuclearly chlorinated derivatives thereof, saturated alkyl esters of acetic acid, saturated alkyl ketones, and saturated alkyl ethers, the said solvent amounting to more than twice the total weight of phosgene present in the cold reaction is evaporated in the hot reaction zone and cooled below −20° C. together with excessive phosgene and generated gaseous hydrogen chloride that have simultaneously evaporated and the resulting solution of phosgene in the said organic solvent is separated from gaseous hydrogen chloride and recirculated to the cold reaction zone while cold. The advantageous feature of this invention exists in quite reasonably and simply combining the stage of recovering phosgene and a large part of solvent with cold and hot reactions.

Another purpose of this invention is to provide a process of continuously producing organic isocyanates, improved in the surprisingly simplified and economized equipment for phosgenating reaction and all the other respects.

The following are principal features of the process of this invention.

The 1st feature is that the recovery of excessive phosgene may be greatly improved in spite of rather moderate cooling temperature due to the partial pressure of phosgene which may be effectively lowered by cooling the outlet gaseous phosgene in the presence of solvent according to this invention. For example, when an inert solvent such as chlorobenzene amounting to four times the weight of phosgene present in the cold reactor is evaporated in the hot reaction zone and thereafter cooled to −30° C. without separating gaseous and liquid phases from each other, the amount of phosgene lost with gaseous hydrogen chloride is no more than 3% by weight of gaseous hydrogen chloride. This amount is only one-fifth of the loss of phosgene inevitable when the two component mixture of phosgene and hydrogen chloride is cooled to the same temperature according to the conventional process. Furthermore, in the conventional process, temperatures as low as about −60° C. are required to decrease the loss of phosgene to our level. In addition, the mixture of gas and liquid may be more effectively cooled than the gaseous mixture.

Therefore, in the process of the present invention, the desirable advantages of reasonably simplifying the system for recovering and circulating excessive phosgene and reducing cost for equipment without using special apparatus for recovering and recirculating gaseous phosgene may be obtained.

The 2nd feature is concerned with the removal of generated heat of reaction. A cooling unit has been so far regarded as indispensable in the stage of cold reaction for removing a large amount of heat generated in the cold reaction zone. However, in the process of this invention, a large amount of deeply cooled phosgene solution is recirculated to the cold reaction zone and absorbs heat of reaction, so that the reaction mixture in the cold reaction zone may be adjusted to a suitable temperature even without any special cooling unit and the energy used for the preceding deep cooling may be completely utilized.

The 3rd feature is that concentrated solution of crude isocyanate may be directly obtained from the hot reaction zone. One of the essential requirements for improving yield of isocyanates, is to prepare as fine as possible suspension of reaction mixture in the cold reaction, which in turn require a large volume of solvent. On the other hand, in the hot reaction, a large part of solvent used in the cold reaction becomes unnecessary, only a small amount of solvent being sufficient. By taking advantage of these aspects of the cold and hot reactions, we have established a very reasonable process of the present invention. In the process of this invention, a large part of solvent only circulates between the hot reaction zone and the cold reaction zone. In addition, since the molar concentration of crude isocyanate in the reaction mixture recovered from the hot reaction zone is equal to that of amine introduced into the cold reaction zone and amine may be supplied as a concentrated solution, a concentrated solution of crude isocyanate may be directly recovered from the hot reaction zone. Accordingly, the reacting and storing vessels and the system of recovering solvent may be simplified and the expense for equipment reduced.

The present invention may be most advantageously employed for the production of diisocyanates with boiling points higher than 200° C. and polyisocyanates, particularly tolylene diisocyanate, naphthalene diisocyanate, methylene-bis-(phenyl isocyanate) and mixtures thereof with polymethylene-poly-(phenylisocyanate)

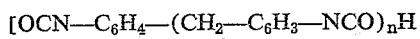

$n=2$ or more], diphenylether diisocyanate, hexamethylene diisocyanate, tetramethylenediisocyanate, xylylene diisocyanate and cyclohexyl diisocyanate.

The inert organic solvent employed for phosgenation in the present process should have boiling point lower than that of isocyanate to be produced, preferably in the range from 100° to 190° C. at atmospheric pressure and should be selected from the group including aromatic hydrocarbons and their nuclearly chlorinated derivatives, saturated alkyl esters of acetic acid, saturated alkyl ketones and saturated alkyl ethers. The representative examples are toluene, xylene, chlorotoluene, chlorobenzene, o-dichlorobenzene, butyl acetate, amyl acetate, methylcellosolve acetate, ethylcellosolve acetate, methoxybutyl acetate and methyl isobutyl ketone.

For carrying out the process of this invention, a suspension or a solution containing a diamine or a polyamine as a starting material in the above mentioned inert solvent is directly supplied to a cold reactor and treated with phosgene. Although the amount of solvent employed for dissolving amine varies depending on the kind of amine, one to five times the weight of amine is usual. However, in some cases, an amine in molten state may be introduced into the reactor without solvent. Furthermore, since organic di- or polyamines easily dissolve in an inert solvent if slightly warmed, the amount of solvent may be reduced without any adverse effect on the smooth advance of reaction, if warm solution of the said amine is added to the cold reactor.

Although the amount of solvent to be evaporated from the hot reactor should be decided based on the amount of solvent necessary for cold reaction which is usually 10–25 times the weight of amine, more than twice the total weight of phosgene introduced into the cold reactor is necessary. If the amount of evaporated solvent is below this lower limit, the recovery of phosgene decreases and the above mentioned features of the present invention cannot be obtained. Practically, the amount of distilled solvent should be 3–5 times the total weight of phosgene supplied to the cold reactor.

The gas-liquid mixture consisting of gaseous hydrogen chloride, phosgene and inert solvent should be at least cooled below −20° C. The cooling unit capable of effecting intimate contact between gaseous and liquid phases should be selected, preferably connecting thereto another unit for bringing about sufficient gas-liquid contact after cooling. At cooling temperatures above −20° C., the loss of phosgene increases and thus more than the above specified amount of solvent must be evaporated. Although the required cooling temperature depends on the allowable loss of phosgene and the amount of evaporating solvent, the temperature of about −30° C. would be advantageous in reference to the practical factors such as energy for evaporation, energy for cooling and cost of equipment.

The cold reaction temperature should preferably be adjusted to 0°–30° C. The optimum temperature largely depends upon the kind of amine employed, the type of cold reactor, the amount of solvent employed and the amount of phosgene. However, in some cases, even the temperatures up to 60° C. gave no significant adverse effect on the yield of isocyanate.

The temperature in the hot reactor should be raised over 90° C., though the optimum temperature is determined by the boiling point of solvent used. In this stage heat must be afforded so that the evaporating solvent amounts to more than twice of the total weight of phosgene supplied to the cold reactor. Thus, the hot reactor must have a heat conducting surface for providing heat sufficient for allowing the evaporation of the above specified amount of solvent. For this purpose, a mixing kettle equipped with jacket, preferably with heater coil, evaporating can, a laterally positioned, rotating and disk-formed vessel for effecting both the evaporation and the reaction and continuous thin-layer evaporators of various types may be used.

Although the amount of phosgene used in the cold and hot reactions varies according to the form and the structure of reactors, usually a major portion of phosgene is supplied to the cold reactor and a minor portion to the hot reactor. For successfully carrying out the process of this invention, the total weight of phosgene introduced into both cold and hot reactors should be suitably adjusted to 1.5 to 3 times the theoretical equivalent amount necessary for isocyanate formation. When more phosgene is employed, a large amount of solvent must be evaporated from the hot reactor for preventing loss of phosgene, thus the result being nothing more than useless expenditure of energy and cost of equipment.

For the sake of a better appreciation of this invention, reference will be made to the figure.

In FIG. 1, a solution of a starting amine in an inert solvent is supplied to cold reactor 2 through conduit 1 using pressure and the suspension of reaction mixture formed in the reactor 2 is sent to hot reactors 4 and 5 with pump 3. The mixture of generated gaseous hydrogen chloride, excessive phosgene and evaporated solvent in the reactors 4 and 5 is sent together to water-cooler 10 through conduits 8 and 9 and cooled to about 20° C. Then, the mixture, still in a thoroughly mixed condition, is sent to a cooler 11, operated with directly expanding Freon gas, to be cooled below −20° C. Thereafter, gas and liquid phases are separated from each other in separator 12. The gaseous phase is discharged to atmosphere after passing through conduit 13, an apparatus for absorbing gaseous hydrogen chloride and an apparatus for decomposing phosgene. The solvent phase, while being maintained below −20° C., is recirculated to the cold reactor 2 through conduit 14. An amount of phosgene equal to that spent is additionally supplied into the cold reactor 2 through conduit 15 preferably in liquefied state and to the hot reactor 5 through conduit 7 preferably in gaseous state. Meanwhile, the reaction product was removed from the hot reactor 5 through conduit 6 and sent to the stage of after-treatment.

The following specific examples were presented for further understanding of this invention, but should not be construed as limiting the scope of this invention.

EXAMPLE 1

Using a continuously phosgenating apparatus as shown in FIG. 1, a solution obtained by dissolving 1.00 part by weight of methylene-bis(4-aniline) in 3.0 parts of chlorobenzene at 50° C. was pumped into a 300 l. cold reactor 2 equipped with a stirring device at a rate of 211 kg./hour, while the recirculated solution containing 22% phosgene in chlorobenzene that was cooled to below −30° C., and fresh feed of phosgene were supplied to the same reactor at the rates of 840 kg./hr. and 40 kg./hr., respectively. With these feeding rates, chlorobenzene, in an amount of 15.4 times the weight of starting amine existed in the cold reactor. The resulting suspension of the cold reaction mixture in chlorobenzene having attained to a temperature of 20° C. due to heat of reaction was transferred with pump 3 to a 300 l. stirred iron kettle (hot reactor 4) equipped with steam jacket at a rate of about 1090 kg./hr. so that a constant liquid level is maintained in the cold reactor.

The hot reactor 4 was heated with steam at a pressure of 5 kg./cm.² to evaporate chlorobenzene at a rate of 300 kg./hr. together with generated gaseous hydrogen chloride and excessive phosgene. The internal temperature of the reactor 4 attained to 110° C. The residual liquor in the reactor 4 was allowed to overflow into the hot reactor 5, a same type reactor as the reactor 4, where phosgene was freshly fed at a rate of 17 kg./hr. Chlorobenzene was again evaporated from the hot reactor at a rate of 355 kg./hr. The internal temperature of the reactor became 130° C. The combined mixture of gaseous hydrogen chloride, excessive phosgene and chlorobenzene, discharged from the reactors 4 and 5, was preliminarily cooled to 20° C. in water-cooler 10 and finally cooled with a manifold cooler using directly expanding Freon while maintaining the state of gas-liquid mixture. Then the mixture was separated into a gaseous phase of hydrogen chloride containing a slight amount of phosgene and a liquid phase of 840 kg./hr. of chlorobenzene containing 22% of phosgene: the former containing only 3.4 molar percent of phosgene was sent through conduit 13 and discarded after treating in a hydrogen chloride absorber and a phosgene decomposing tower, with the loss of phosgene no more than 7% of the theoretical equivalent amount; the latter was recirculated to the cold reactor 2 through conduit 14 to be used again. The overflowing reaction product was discharged from the hot reactor 5 through conduit 6 at a rate of 225 kg./hr. The discharged mixture was found to contain 1.24 parts by weight of methylene-bis-(4-phenylisocyanate), 0.02 part by weight of side-reaction products and 3.00 parts by weight of chlorobenzene, corresponding to the yields methylene bis-(4-phenylisocyanate) which were 98% based on the starting amine and 91% based on the spent phosgene. The loss of chlorobenzene was 5 kg./day.

EXAMPLE 2

To a reaction kettle equipped with a stirring device was introduced 2060 parts by weight of aniline and 622 parts by weight of 35% hydrochloric acid. The resulting mixture was stirred, maintained at a temperature of 30°–40° C. and gradually added with 977 parts by weight of 36% aqueous formaldehyde. After the completion of addition, the mixture was stirred further about 2 hours at the same temperature, then gradually heated to 90° C. and maintained at this temperature for 3 hours to finish the condensation reaction. The reaction mixture was neutralized with an aqueous sodium hydroxide, washed with water and separated into an oil phase and an aqueous phase. Water and unchanged aniline were removed from the oil phase by distilling in vacuo using a thin layer evaporator to give 1900 parts by weight of polymethylene-poly-(aniline) mixture as a viscous liquid

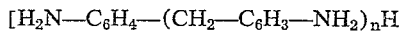

[$n=1$, 55%; $n>2$, 45%; $NH_2$ content, 15.8%]

Using the continuous phosgenation apparatus same as in Example 1, a solution containing 1.00 part by weight of polyamine in 3.00 parts by weight of chlorobenzene was pumped into the cold reactor 2 not equipped with cooling unit at a rate of 211 kg./hr., while recirculated chlorobenzene containing 20% phosgene which have been deeply cooled to −25° C. and fresh feed of phosgene were supplied to the same reactor at rates of 750 kg./hr. and 45 kg./hr., respectively. In this manner, chlorobenzene, in an amount 14.8 times the weight of starting amine, existed in the reactor. The temperature of the reaction mixture rose to 26° C. due to heat of reaction. The cold reaction product suspended in chlorobenzene was transferred to a 300 l.-stirred kettle of iron equipped with steam jacket at a rate of 1036 kg./hr. so that the liquid in the cold reactor maintain a constant level. The hot reactor was heated with steam at a pressure of 5 kg./cm.² so as to evaporate chlorobenzene at a rate of 300 kg./hr. together with gaseous hydrogen chloride and excessive phosgene. The internal temperature of the reactor 4 rose to 115° C. The residual liquor in the reactor 4 was allowed to overflow into the hot reactor 5 (same type as 4) and further treated with fresh phosgene, supplied at a rate of 12.5 kg./hr. Again, chlorobenzene was evaporated at a rate of 324 kg./hr. The internal temperature reached at 131° C.

The resulting combined mixture of gaseous hydrogen chloride, excessive phosgene and chlorobenzene was cooled to 20° C. in a water-cooler 10, further cooled down to −25° C. with a manifold cooler using directly expanding Freon and finally separated into a gaseous phase of hydrogen chloride containing a trace of phosgene and 780 kg./hr. of chlorobenzene phase containing 20% phosgene. The gaseous phase containing only 5.1 molar percent of phosgene was discarded into atmosphere after passing through conduit 13, a hydrochloric acid absorber and a phosgene decomposing tower. The loss of phosgene was 10.5% of theoretical equivalent amount. On the other hand, the solvent phase was recirculated to the cold reactor 2 through conduit 14 and used again. The reaction product overflowing from the hot reactor 5 after the end of reaction was discharged from conduit 6 and further treated to yield 66.5 kg./hr. of polymethylene-poly-(phenylisocyanate) containing 32.2% of NCO. The yield of isocyanate was 97% based on $NH_2$ groups and 87.5% based on spent phosgene. Loss of chlorobenzene was recorded to be 6 kg./day.

EXAMPLE 3

A suspension containing fine particles of 1.00 part by weight of 2,4-tolylene diamine in 5.00 parts by weight of chlorobenzene was supplied to a cold reactor not being cooled from outside at a rate of 228 kg./hr. while recirculated chlorobenzene containing 20% phosgene which had been cooled to −30° C. and fresh feed of phosgene were added at rates of 700 kg./hr. and 50 kg./hr. respectively. With this operative condition, chlorobenzene, in an amount 19.7 times that of starting amine, existed in the cold reaction zone. The cold reaction mixture attained to a temperature of 25° C. The cold reaction product suspended in chlorobenzene was transferred to a 300 l. stirred iron kettle (hot reactor 4) equipped with steam jacket at a rate of 918 kg./hr. so as to maintain a constant level of liquid in the cold reactor. The hot reactor 4 was heated with steam at a pressure of 5 kg./cm.² to evaporate chlorobenzene at a rate of 260 kg./hr. together with generated gaseous hydrogen chloride and excessive phosgene. The internal temperature of the reactor recorded 108° C. The residual liquid in the reactor 4 overflowed into another hot reactor 5 (the same type reactor as the reactor 4) and again treated with a stream of fresh phosgene being supplied to the reactor at a rate of 15.5 kg./hr.

Like in the reactor 4, chlorobenzene was evaporated at a rate of 300 kg./hr. from the hot reactor 5. The internal temperature was 132° C. The combined mixture of gaseous hydrogen chloride, excessive phosgene and chlorobenzene was cooled to 20° C. in a water-cooler 10. The mixture was further cooled down to −30° C. in a manifold cooler using directly expanding Freon and separated into gaseous phase containing hydrogen chloride and a trace of phosgene and 700 kg./hr. of chlorobenzene phase containing 20% phosgene. The gaseous phase containing 2.9 molar percent of phosgene was led through conduit 13, hydrogen chloride absorber and phosgene decomposing tower and finally discarded into atmosphere. The loss of phosgene was 6% of the theoretical equivalent amount. On the other hand, the liquid phase was sent to the cold reactor 2 through conduit 14 and used again. The residual reaction product was allowed to overflow from the hot reactor through conduit 6 at a rate of 244 kg./hr. The discharged solution contained 1.35 parts by weight of 2,4-tolylene diisocyanate, 0.07 part by weight of side reaction products and 5.00 parts by weight of chlorobenzene, thus corresponding to yields of 2,4-tolylene diisocyanate which were calculated to be 95%, based on the starting amine and 89%, based on the spent phosgene respectively. Chlorobenzene was lost at a rate of 7 kg./day.

What we claim is:

1. In the continuous process for producing an isocyanate, by reacting at least one amine selected from the group consisting of aliphatic primary diamines, aromatic primary diamines, and aromatic primary polyamines, with excess phosgene in the presence of an inert solvent, by reacting the components sequentially in a first reaction zone and then in a second reaction zone, the improvement which comprises (i) maintaining said first reaction zone at a temperature below 60°, and utilizing an inert solvent having a boiling point between 100 and 190° C. and less than the boiling point of the product isocyanate;
   (ii) continuously introducing the reaction mixture containing the reaction product produced in the first reaction zone to the second reaction zone, and maintaining said second reaction zone at a temperature above the boiling point of said inert solvent, whereby a gaseous mixture containing said inert solvent, unreacted phosgene, and hydrogen chloride gas generated during the reaction process, is evaporated, the total amount of the inert solvent evaporated in said second reaction zone being controlled so as to be in an amount greater than twice the total amount of phosgene introduced into said first reaction zone;
   (iii) introducing additional phosgene into said second reaction zone to complete the reaction producing the product isocyanate;
   (iv) recovering the isocyanate product from said second reaction zone;
   (v) recovering said evaporated gaseous mixture of inert solvent, unreacted phosgene and hydrogen chloride, from said second reaction zone and cooling said gaseous mixture to a temperature below −20° C., to separate the hydrogen chloride gas from the inert solvent and phosgene which is recovered as a very cold solution of phosgene in said inert solvent; and
   (vi) recycling said very cold solution of phosgene in said inert solvent to the first reaction zone.

2. The process of claim 1, wherein a mixture of an aromatic primary diamine and an aromatic primary polyamine is treated with phosgene.

3. The process of claim 1 wherein said inert solvent is selected from the group consisting of aromatic hydrocarbons and chlorinated aromatic hydrocarbons, saturated alkyl esters of acetic acid, saturated alkyl ketones, and saturated alkyl ethers.

4. The process of claim 1, wherein the first reaction zone is maintained at a temperature of 0° to 30° C., and the second reaction zone is maintained at a temperature of 110° to 135° C.

5. The process of claim 4, wherein the amine reactant is methylene-bis-(aniline), and the inert solvent is monochlorobenzene.

6. The process of claim 4, wherein the amine reactants are polymethylene - poly - (aniline) and methylene - bis-(aniline), and the inert solvent is monochlorobenzene.

7. The process of claim 4, wherein the amine reactant is tolylene diamine, and the inert solvent is monochlorobenzene.

References Cited

UNITED STATES PATENTS 3,226,410  12/1965  Hettich et al. _____ 260—453

FOREIGN PATENTS 632,256  12/1961  Canada.

CHARLES B. PARKER, *Primary Examiner.*

D. H. TORRENCE, *Assistant Examiner.*